Nov. 5, 1935.  A. DEROSSI  2,020,174
VEHICLE HOIST FRAME
Filed June 26, 1934  2 Sheets-Sheet 1

INVENTOR.
A. Derossi
BY
Glascock Downing Seebold
ATTORNEYS

Nov. 5, 1935.  A. DEROSSI  2,020,174

VEHICLE HOIST FRAME

Filed June 26, 1934  2 Sheets-Sheet 2

INVENTOR.
A. Derossi
BY
Glascock Downing Seebold
ATTORNEYS.

Patented Nov. 5, 1935

2,020,174

UNITED STATES PATENT OFFICE 2,020,174

VEHICLE HOIST FRAME

Antonio Derossi, Triest, Italy

Application June 26, 1934, Serial No. 732,539
In Italy July 6, 1933

6 Claims. (Cl. 294—67)

The apparatus forming the subject matter of the present invention is essentially characterized by a top cross which is hung by ropes to the hoisting crane, the cross realizing an equilibrated suspension system with four suspension points, from the ends of the said cross being suspended (by means of two ropes which remain in approximately vertical position relatively to the symmetry axis of the apparatus) four carriers adapted to carry four bars for the vehicle wheels to rest upon, the carriers being so designed as to leave the said bars completely free when the carriers, and therewith the vehicle, rest upon the ground, whereas they close themselves and firmly clamp the bars as soon as the hoisting of the loaded apparatus is commenced.

The apparatus is illustrated by way of example in the accompanying drawings in which.

The apparatus essentially comprises a top suspension-cross $a$ built up of two tubular rods $b$ interconnected at the center by a pivot $c$. Each of the two rods $b$ is provided at the center with a plate-disc, $d'$—$d''$, respectively, each disc having in it a slot $e'$—$e''$ in the shape of the arc of a circle.

The discs $d'$—$d''$ serve, not only to supply a suitable supporting surface for the two tubular rods $b$ making up the cross, but also to automatically determine—by means of the annular slots $e'$—$e''$—the correct degree of aperture of the bars $b$, which are then fixed in the desired position of aperture during the working of the apparatus by means of a key $f$.

The cross $a$ is connected to the main suspension shackle $g$ (to be fitted to the hook of the hoisting crane) by means of a set of wire ropes $h$ the lower ends of which are secured to four stirrups $i$ provided at the ends of tubular rods $b$ forming the cross.

From the said stirrups $i$ are suspended by means of ropes $l$, the four carriers $m$.

Figure 1:
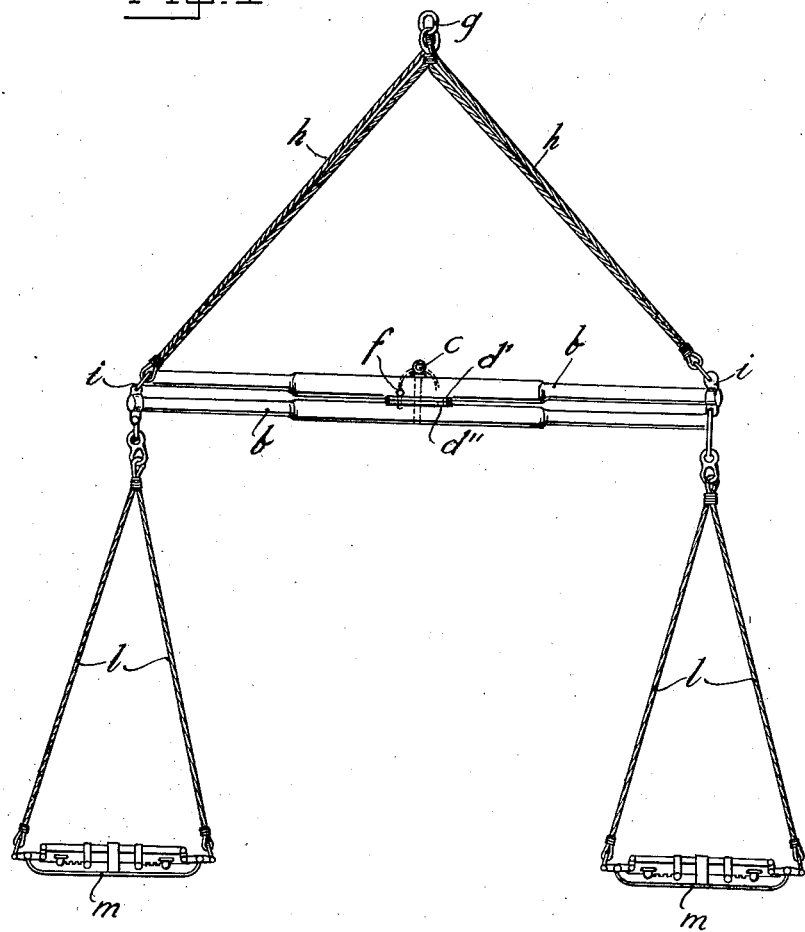
Fig. 1 shows the complete apparatus in side view.
Figure 3:
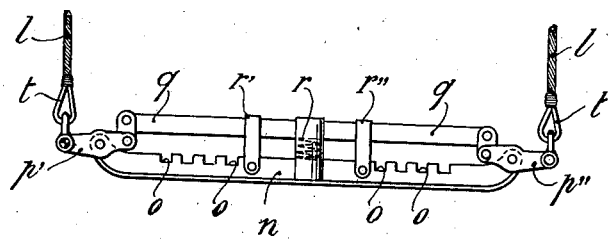
Fig. 3 shows one of the four carriers in detail.
Figure 2:
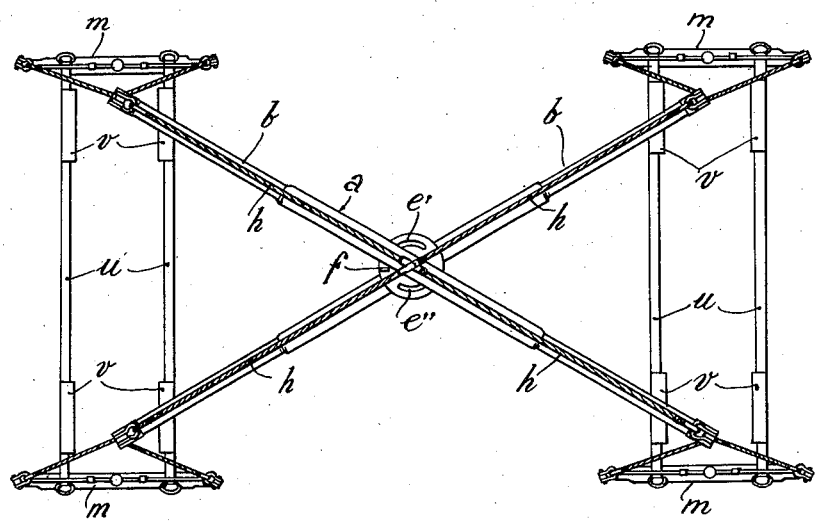
Fig. 2 shows the same in plan.

The carrier $m$ (see details in Fig. 3) comprise a base $n$ consisting in a T-bar the vertical web of which has several notches $o$ formed in it.

The two ends of the base $n$ are connected, by means of two levers $p'$—$p''$, to the upper or closing bar $q$, the latter being guided in vertical direction by the two stirrups $r'$—$r''$. In the center portion of the carriers a spring $r$ is arranged, the spring being lodged in a tubular case and always tending to maintain the closing bar $q$ in open conditions when the carrier is loaded.

Due to the fact that the carrier $m$ is suspended by means of ropes threaded in the rings or shackles $t$ provided at the ends of the levers $p$, it will be obvious that, when a load is weighing on the base $n$ of the carrier and a traction is put on the suspension ropes $l$, the closing bar $q$ will be lowered by the levers $p'$—$p''$ against the action of the spring $r$ and will clamp the bars $u$ on which rest the wheels of the motor car to be raised, the bars $u$ being lodged in the notches $o$.

Figure 4:
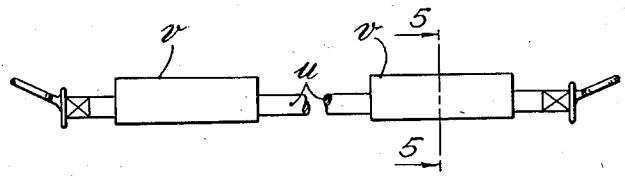
Fig. 4 shows one of the wheel-carrying bars $u$ in detail.
Figure 5:
Fig. 5 is a cross section through the line 5—5 of Fig. 4.

The resting bars $u$ (see Fig. 4) are four in all, viz. two for the forward and two for the rear wheels. The bars are tubular in section and—where the vehicle wheels bear on them—they are fitted with plates or ribs $v$ which serve to afford a better and wider resting surface for said wheels. At their two ends the bars $u$ are square in section in order to prevent them from turning in the notches $o$ of the base $n$.

Besides, on the two ends of the bars $u$ a hook is soldered, in order to facilitate the seizing and handling of the bars when they must be put in place.

With the apparatus in question, the hoisting operations for shipping and unshipping a motor car into and from a steamer are rendered simple and quick, without the possibility of the hoisted vehicles being damaged. Once, namely, the top cross which is the heaviest part has been secured to the crane hook, the said cross remains hanging from the crane for the shipment and unshipment of any number of motor cars.

Afterwards, nothing else will have to be done except to hang the four carriers $m$ to the cross and to put in place, in front of and behind the car wheels, one of the bars $u$, their ends being lodged in the notches $o$ of carriers.

When, directly after this, the hoisting by means of the crane is started, the carriers will firmly clamp the bars $u$ and prevent them from shifting their position.

The vertical suspension ropes $l$ of the carriers $m$ are so arranged as to be at least 10 centimeters away from the mudguards of even the largest motor car sizes and cannot do any damage, while the vehicle, owing to the equilibrated suspension system, will rest with its four wheels on the bars $u$ as if it were resting on the ground.

As soon as the vehicle has been lowered on to the ground and its four wheels touch the soil, the carriers $m$ will open automatically due to the action of the spring $r$ and will let fall the $u$ suspension bars, which will therefore leave the motor car completely free.

It is pointed out that the apparatus in question, in addition to the advantages mentioned above, offers also the advantages of being very light and robust and of permitting of its being accommodated in a reduced space, since the top cross can be readily folded up and reduced to two nearly parallel tubes, while all the other parts occupy a quite limited space.

Having now particularly described and ascertained the nature of my said invention and in what manner the same is to be performed, I declare that what I claim is:

1. An apparatus for use in hoisting and lowering automobiles and the like comprising two beams, means for pivotally connecting said beams mid length, means for limiting the pivotal movement thereof, suspension means at the ends of each of said beams, and wheel supporting means each resting in two of said suspension means.

2. An apparatus for use in hoisting and lowering automobiles and the like comprising a plurality of beams, means pivotally connecting said beams mid length, means for holding said beams in angularly adjusted position, means for suspending said beams secured to the end portions of said beams, suspension means depending from the end portion of each of said beams, and supporting means resting in two of said suspension means.

3. The device as claimed in claim 1, in which the suspension means comprises a branched flexible cable, a bar having notches therein, upright guides on said bar, levers pivoted intermediate their ends at the ends of said bar, a second bar parallel to and above said first bar, links connecting the ends of said second bar to the inner arms of said levers, the outer arms of said levers being connected to the corresponding branches of the flexible cable whereby any strain on the branch of the cable moves the second bar down toward the first bar.

4. In a hoisting apparatus, a branched cable, a holding device comprising a bar with notches in its upper surface, a two-armed lever pivoted to each end of said bar, a second bar parallel to and above said first bar, a link adjacent each end of said second bar connected to one arm of one of said levers and means for connecting the other arm of each of said levers to one of the branches of said cable whereby when strain is put upon said cable said second bar will be clamped down upon said first bar.

5. The device as claimed in claim 4 wherein there are guides on said first bar to guide the second bar in its clamping and unclamping movement and spring means for raising said second bar when the strain on the cable is released.

6. The device as claimed in claim 1 in which the wheel supporting means consists of tubular bars of square cross section in their end portions and having curved plates adapted to form a bearing for wheels.

ANTONIO DEROSSI.